United States Patent
Li et al.

(10) Patent No.: US 10,277,587 B2
(45) Date of Patent: Apr. 30, 2019

(54) INSTANTIATION OF MULTIPLE ELECTRONIC SUBSCRIBER IDENTITY MODULE (ESIM) INSTANCES

(71) Applicant: Apple Inc., Cupertino, CA (US)

(72) Inventors: Li Li, Los Altos, CA (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 15/287,614

(22) Filed: Oct. 6, 2016

(65) Prior Publication Data
US 2017/0104750 A1    Apr. 13, 2017

Related U.S. Application Data

(60) Provisional application No. 62/239,236, filed on Oct. 8, 2015.

(51) Int. Cl.
*H04L 29/06* (2006.01)
*H04W 12/04* (2009.01)
*H04W 12/06* (2009.01)

(52) U.S. Cl.
CPC ...... *H04L 63/0853* (2013.01); *H04L 63/0435* (2013.01); *H04L 63/061* (2013.01); *H04L 63/062* (2013.01); *H04W 12/04* (2013.01); *H04W 12/06* (2013.01)

(58) Field of Classification Search
CPC .......................... H04L 63/0853; H04L 63/0435
USPC ......................................................... 713/159
See application file for complete search history.

(56) References Cited

U.S. PATENT DOCUMENTS

| | | |
|---|---|---|
| 8,666,368 B2 | 3/2014 | Schell et al. |
| 8,996,002 B2 | 3/2015 | Rodgers et al. |
| 9,439,062 B2 | 9/2016 | Li et al. |
| 9,831,903 B1 * | 11/2017 | Narasimhan ......... H04B 1/3816 |

(Continued)

FOREIGN PATENT DOCUMENTS

WO    WO 2016150574    * 9/2016    ............ H04W 8/205

OTHER PUBLICATIONS

International Patent Application No. PCT/US2016/055930—International Search Report and Written Opinion dated Jan. 25, 2017.

(Continued)

*Primary Examiner* — Anthony D Brown
(74) *Attorney, Agent, or Firm* — Dickinson Wright RLLP

(57) ABSTRACT

Methods are provided for instantiating multiple electronic subscriber identity modules (eSIMs) to an electronic universal integrated circuit card (eUICC) using a manufacturer-installed data binary large object (data blob). An eSIM package including the data blob in encrypted form is securely installed in the eUICC in a manufacturing environment. A key encryption key (KEK) associated with the eSIM package is separately provided to an original equipment manufacturer (OEM) wireless device factory. The OEM wireless device factory provides the KEK to the eUICC within a given wireless device. The eUICC uses the KEK to decrypt the eSIM package and provide the data blob. The eUICC can receive a request to instantiate a first eSIM. The eUICC can instantiate the first eSIM using data from the data blob. A user can then access network services using the wireless device. Subsequently, a second eSIM can be instantiated by the eUICC using the data blob.

20 Claims, 12 Drawing Sheets

(56) References Cited

U.S. PATENT DOCUMENTS

| | | |
|---|---|---|
| 2003/0109079 A1 | 6/2003 | Yamaguchi et al. |
| 2013/0205390 A1 | 8/2013 | Hauck et al. |
| 2013/0227646 A1 | 8/2013 | Haggerty et al. |
| 2014/0134981 A1 | 5/2014 | Park et al. |
| 2014/0298018 A1 | 10/2014 | Haggerty et al. |
| 2014/0349617 A1 | 11/2014 | Li et al. |
| 2016/0337780 A1* | 11/2016 | Li .......................... H04W 8/20 |

OTHER PUBLICATIONS

3rd Generation Partnership Project,Technical Specification Group Services and System Aspects, 3G Security, Specification of the Milenage Algorithm Set: An example algorithm set for the 3GPP authentication and key generation functions f1, f1, f2, f3, f4, f5 and f5, Document 1: General (Release 12); 3GPP TS 35.205 v12.0.0; Sep. 2014; 15 pgs.

3rd Generation Partnership Project, Technical Specification Group Services and System Aspects, 3GPP System Architecture Evolution (SAE), Security architecture (Release 12); 3GPP TS 33.401 v12.15.0; Sep. 2015; 131 pgs.

* cited by examiner

INSTANTIATION OF MULTIPLE ELECTRONIC SUBSCRIBER IDENTITY MODULE (ESIM) INSTANCES

PRIORITY APPLICATION

This application claims the benefit of U.S. Provisional Patent Application No. 62/239,236 filed Oct. 8, 2015 and entitled "INSTANTIATION OF MULTIPLE ELECTRONIC SUBSCRIBER IDENTITY MODULE INSTANCES," which is hereby incorporated by reference.

FIELD

The described embodiments relate generally to wireless communications technology. More particularly, the present embodiments relate to preloading an embedded universal integrated circuit card (eUICC) with an electronic subscriber identity module (eSIM) package including a data blob (binary large object). Multiple eSIMs may then be instantiated from the data blob.

BACKGROUND

Wireless communication devices, such as smart phones, have traditionally been configured to use universal integrated circuit cards (UICCs) that provide access to wireless network services. A UICC is a physically secure device. UICCs can contain one or more applications. One of the applications can be a USIM, similarly, an eSIM. eSIMs/USIMs allow registration with a mobile network with appropriate security. A UICC typically takes the form of a small removable card (e.g., a subscriber identity module (SIM) card) that is inserted into a wireless communication device. In most cases, each UICC is associated with a single issuer—such as a mobile network operator (MNO)—that controls the programming and distribution of the UICC.

In more recent implementations, non-removable UICCs—referred to herein as embedded UICCs (eUICCs)—are being included on system boards of wireless communication devices. These eUICCs are distinct from the traditional removable UICCs in that the eUICCs are non-removable and soldered to the system boards of wireless communication devices. In some cases, an eUICC can be programmed with one or more eSIMs, each of which can emulate and replicate the architecture of a typical SIM to enable a wireless communication device including the eUICC to access services provided by mobile network operators. An eSIM allows secure registration with an MNO.

The use of eUICCs and eSIMs can offer advantages over traditional UICCs. For example, the use of an eUICC can provide wireless communication device manufacturers with increased flexibility in design due to the lack of a requirement to design the wireless communication device to accommodate the size and form factor of a removable SIM card.

Remote provisioning (e.g., over the air) of eSIMs can be used to configure a wireless communication device to access a mobile network operator's network. However, there are regulatory and commercial reasons for avoiding over the air eSIM installation. Yet, if over the air installation of eSIMs is not available, the flow of wireless devices in the market place may be constrained because an after-market buyer cannot conveniently obtain an eSIM for a purchased wireless device.

When the eUICC form factor is very small, such as when wafer level chip scale packaging (WLCSP) is used, an eSIM vendor may have difficulty physically load operating system and personalization data into an eUICC. An eUICC chip can be programmed in a wafer context in a chip factory environment, instead of as a separate package and instead of over the air when in a wireless device. However, the carrier or MNO contracting for the manufacture of the eUICC may trust the eSIM vendor, but may not entrust confidential eSIM information to a contracted chipmaker or contracted wireless device factory. In some embodiments, the MNO does not trust the chip vendor, does not trust the wireless device factory and either does not trust or is unable to perform over the air eSIM provisioning.

Traditional approaches for installing eSIMs into eUICCs fail to address the problems of the after-market buyer who has bought a wireless device without an eSIM. Also, a problem of eSIM provisioning to eUICCs in an untrusted factory is not addressed by traditional approaches.

SUMMARY

One approach to solve these problems involves creating an eSIM package including a data blob and installing the eSIM package into an eUICC in a manufacturing environment. An eSIM package is a binary data object, not a piece of hardware. The eUICC is subsequently embedded into a wireless device by a manufacturer. The eUICC then receives a command to instantiate an eSIM. In some embodiments, the eUICC, using the data in the data blob, then populates a file structure in its memory with a subscriber identity module (SIM) profile, thus instantiating a minimal eSIM. In some embodiments, applets are also instantiated based on data in the data blob. In this way, an eSIM is instantiated without over the air provisioning. In some embodiments, the minimal eSIM is functional and contains all data necessary to access network services.

In some embodiments, the minimal eSIM is made a unique eSIM based on unique data. The unique eSIM can then be made into a functional eSIM by communicating with an MNO. In some embodiments, the functional eSIM includes an international mobile subscriber identity (IMSI), a subscriber key and a phone number. The user can then access MNO services using the wireless device. For example, incoming calls to the phone number will be routed to the wireless device.

The user may delete the eSIM and sell the wireless device to another party. While the wireless device is owned by the second party, the eUICC can receive a command to instantiate an eSIM. The eUICC then follows steps to create a minimal eSIM and makes the eSIM unique. The wireless device can then communicate with an MNO and receive one or more of a new IMSI, a new subscriber key, and a different phone number. Finally, the second party can use the wireless device to access MNO services. For example, incoming calls to the different phone number will be routed to the wireless device.

Multiple eSIM instances can exist in the eUICC at the same time. In some embodiments, a wireless device is shared by family members or by family and friends. Each person may have a unique eSIM instance associated with them. Each user of the device can select which eSIM to use when using the device.

The eSIM package installed in the manufacturing environment may be specific to an MNO or it may be a generic package with utility to a number of different MNOs. A minimal eSIM can include an over the air (OTA) key which is common to more than one MNO. In some embodiments, an MNO uses an OTA key set which is kept secret from other MNOs. A key set comprises ciphering and integrity keys. After the eUICC instantiates the minimal eSIM, a given MNO can authenticate itself to the eSIM using the OTA key set. The MNO can then customize the eSIM using remote file management (RFM) or remote applet management (RAM) protocols. In some embodiments, after the MNO authenticates the instantiated eSIM, the MNO rotates (i.e. replaces) the key set in the eSIM. For example, the MNO can use a PUT KEY provisioning command to replace the existing key set after authentication.

The manufacturing environment can include untrusted parties. For example, an MNO may contract with an eSIM vendor to produce a large number of eSIMs, such as 1 million eSIMs. The eSIMs are defined by the MNO. The MNO trusts the eSIM vendor, but may not trust a chip vendor that is going to produce eUICC chips programmed with the eSIM packages or similar confidential data. In some embodiments, the eSIM vendor also generates eUICC operating system (OS) files and generates personalization data (sometimes referred to as "perso data"). The information encrypted at the eSIM vendor can also include a set of one-time-use elements to be used in rendering subsequently instantiated eSIMs unique. In some embodiments the information to be encrypted also includes an integrated circuit card identifier (ICCID). Also, the MNO may not trust a wireless device factory at which the finished wireless devices will be produced. To solve this problem, the eSIM data is encrypted with a key encrypted key (KEK) before going from the eSIM vendor to the chip vendor. Thus, the chip vendor receives encrypted information from the eSIM vendor in the form of encrypted eSIM packages or encrypted data blobs. The chip vendor produces and provides the finished eUICCs (programmed with encrypted eSIM information) to a wireless device factory. The eSIM vendor provides the KEK to an original equipment manufacturer (OEM) server at the wireless device factory.

In some embodiments, the eUICC performs a mutual authentication protocol with the OEM server to establish that the OEM server is authentic and to prove its own (eUICC) identity. The eUICC and the OEM server can establish a session key using one of a number of algorithms. In some embodiments, the OEM server encrypts the KEK with the established session key and sends it to the eUICC. The eUICC then commences decryption, using the KEK, of the encrypted information programmed in to the eUICC by the chip vendor. In some embodiments, one or more defined eSIM profiles decrypted by the eUICC do not represent one or more functional eSIMs. Rather, they represent one or more data blobs from which eSIMs can be instantiated.

A first method performed by an eUICC embedded or housed in a wireless device is provided herein. The first method includes receiving a request to instantiate a eSIM; instantiating the first eSIM using generic data from a data binary large object (data blob); receiving, via the wireless device, an instruction to erase the first eSIM; receiving a request to instantiate a second eSIM; and instantiating the second eSIM using the generic data from the data blob.

A further method by an eUICC embedded in a wireless device is provided herein. The method includes receiving a request to instantiate a first eSIM; and instantiating the first eSIM using generic data from a data blob. In some embodiments, the method includes customizing the first eSIM based on first data from a second data blob; and successfully completing an authentication and key agreement procedure with a mobile network operator subsequent to the customizing. In some embodiments, the method includes customizing the first eSIM based on first data from the data blob or based on second data from the eUICC. In some embodiments, the first data is a first element from a set of one-time-use elements from the data blob. In some embodiments, the second data is a value corresponding to an ICCID. In some embodiments, the method includes receiving, via the wireless device, personalization data including a first IMSI and a first subscriber key from a first MNO; and storing the personalization data in the first eSIM. In some embodiments, the method includes generating a first challenge value based on the first IMSI and the first subscriber key; and sending, via the wireless device, the first challenge value to a first MNO. In some embodiments, the method includes receiving, via the wireless device, an instruction to erase the first eSIM; and erasing the first eSIM. In some embodiments, the method includes receiving a request to instantiate a second eSIM; instantiating the second eSIM using the generic data from the data blob; customizing the second eSIM based on a second element from the set of one-time-use elements or based on an incremented value of an ICCID. In some embodiments, the method includes receiving, via the wireless device, second personalization data comprising a second IMSI and a second subscriber key from a second MNO; and storing the second personalization data in the second eSIM. In some embodiments, the method includes generating a second challenge value based on the second IMSI and the second subscriber key; and sending, via the wireless device, the second challenge value to the second MNO.

This disclosure further describes an eUICC. In some embodiments, the eUICC includes a memory configured to store instructions; processing circuitry coupled to the memory; and an interface coupled to: the memory, the processing circuitry, and a processor of a wireless device, wherein the memory is configured to store instructions that, when executed by the processing circuitry, cause the processing circuitry to carry out steps that include: i) receiving a first request to instantiate a first eSIM, ii) instantiating the first eSIM using generic data from a data blob, and iii) customizing the first eSIM based on first data from the data blob, based on second data from the eUICC, or based on third data from a second data blob. In some embodiments, the memory is further configured to store instructions that, when executed by the processing circuitry, cause the processing circuitry to carry out steps that include: i) receiving a second request to instantiate a second eSIM; ii) instantiating the second eSIM using the generic data from the data blob; iii) customizing the second eSIM based on fourth data from the second data blob; and iv) when the first eSIM is customized based on first data from the data blob or second data from the eUICC: a) receiving, from the processor via the interface, personalization data including a first IMSI and a first subscriber key from a first MNO, and b) storing the personalization data in the first eSIM. In some embodiments, the memory is further configured to store instructions that, when executed by the processing circuitry, cause the processing circuitry to carry out steps that include: i) receiving, via the wireless device, an instruction to erase the first eSIM, and ii) erasing the first eSIM. In some embodiments, the memory is further configured to store instructions that, when executed by the processing circuitry, cause the processing circuitry to carry out steps that include: authenticating the first request using an OTA key set.

This disclosure further describes a non-transitory computer readable storage medium configured to store instructions that, when executed by a processor in an eUICC, cause commands issued by the processor to cause the eUICC to carry out steps that include: receiving a request to instantiate a first eSIM; instantiating the first eSIM using generic data from a data blob; customizing the first eSIM based on first data from the data blob or based on second data from the eUICC; receiving, via the wireless device, an instruction to erase the first eSIM; erasing the first eSIM; receiving a request to instantiate a second eSIM; instantiating the second eSIM using the generic data from the data blob; and customizing the second eSIM based on third data from the data blob or based on fourth data from the eUICC.

This disclosure further provides a method of configuring an apparatus by a chip vendor, the method comprising: receiving, from an eSIM vendor, a plurality of encrypted data blobs; fabricating a wafer, wherein the wafer comprises a plurality of chips; programming a portion of the chips with a portion of the plurality of encrypted data blobs; producing a plurality of wafer level chip scale packages based on the wafer; and sending the plurality of wafer level chip scale packages to a wireless device factory.

This disclosure further provides a method of preserving confidential information using a data blob, the method comprising: by an eSIM vendor: generating one or more eSIM profiles; generating an eSIM encryption key; generating an eSIM authentication key; generating a KEK; encrypting, with the KEK, the one or more eSIM profiles, the eSIM encryption key and the eSIM authentication key to produce a data blob; sending the data blob to a chip vendor; and sending the KEK to a wireless device factory.

This disclosure further provides a method by an eSIM vendor of preserving confidential information using a data blob and a KEK, the method comprising: generating one or more eSIM profiles; generating an eSIM encryption key; generating the KEK; encrypting, with the eSIM encryption key, the one or more eSIM profiles to produce a first encryption result; encrypting, with the KEK, the first encryption result and the eSIM encryption key to produce a second encryption result, wherein the data blob comprises the second encryption result; sending the data blob to a chip vendor; and sending the KEK to a wireless device factory.

This disclosure further provides a method by an eUICC embedded in a wireless device of instantiating multiple eSIMs, the method comprising: receiving an eSIM package including a generic data blob, a first personalization data blob, and a second personalization data blob; receiving a command to instantiate a first eSIM; instantiating the first eSIM from the generic data blob and the first personalization data blob; receiving a command to instantiate a second eSIM; and instantiating the second eSIM from the generic data blob and the second personalization data blob. In some embodiments, the generic data blob comprises an OTA key set of an MNO. In some embodiments, the first personalization data blob comprises a first IMSI and a first subscriber key. In some embodiments, the second personalization data blob comprises a second IMSI and a second subscriber key.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings, which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
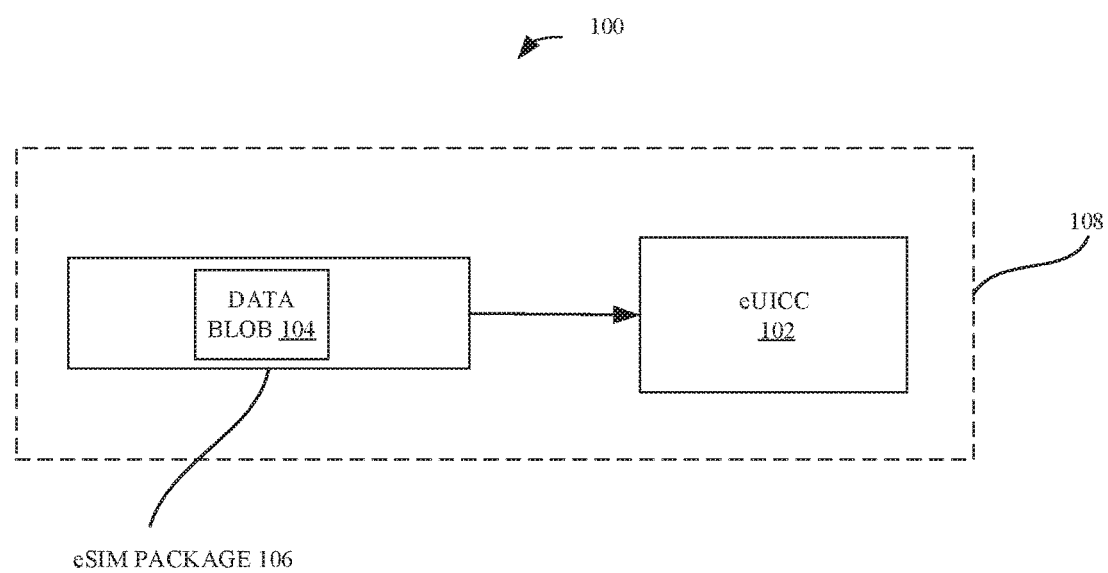
FIG. 1 illustrates an example eSIM package including a data blob being installed into an eUICC in accordance with some embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

One approach to reduce problems with downloading eSIMs over the air involves first creating an eSIM package including a data blob. The eSIM package can then be loaded into an eUICC in a manufacturing environment. The eUICC can subsequently be embedded into a wireless device by a manufacturer. In some embodiments, the eUICC in the wireless device does not initially have an eSIM, but awaits an instantiation command. A user may command, through the wireless device user interface, that an eSIM be instantiated in the eUICC. Alternatively, the eUICC may undergo, via the wireless device, an authentication protocol with a trusted entity, which then commands instantiation of an eSIM. In either case, the eUICC receives a command to instantiate an eSIM. In some embodiments, the eUICC then uses the data in the data blob to populate a file structure in its memory with a SIM profile, thus instantiating a minimal eSIM. In some embodiments, applets are also instantiated based on data in the data blob. In this way, an eSIM is instantiated without over the air provisioning. In some embodiments, the minimal eSIM is functional and contains all data necessary to access network services.

The minimal eSIM can then be made a unique eSIM based on unique data in the eUICC or based on unique data received in some other way. For example, unique data may be received from an MNO. The unique eSIM can then be made into a functional eSIM by communicating with an MNO. In some embodiments, the functional eSIM includes an IMSI, a subscriber key and a phone number. At this point, the user can access MNO services using the wireless device. For example, incoming calls to the phone number will be routed to the wireless device.

The user may delete the eSIM and sell the wireless device to another party. The wireless device, as sold, is in a state in which the eUICC does not have an eSIM. While the wireless device is owned by the second party, the eUICC can receive a command to instantiate an eSIM. The eUICC then follows the steps of populating a file structure to create a minimal eSIM and makes the eSIM unique based on data in the data blob, data received from an MNO, or based on some other unique input. Alternatively, the instantiated eSIM is unique and functional and enables communication with an MNO and access to network services. In some embodiments, after instantiation of the eSIM, the wireless device communicates with an MNO and receives one or more of a new IMSI, a new subscriber key, and a different phone number. Security elements such IMSIs and subscriber keys are discussed in 3GPP TS 35.205, v12.0.0, dated September 2014 and entitled "Specification for the MILENAGE Algorithm Set" (hereinafter "TS 35.205"). TS 35.205 is hereby incorporated by reference. After communication with the MNO, the second party can use the wireless device to access MNO services. For example, incoming calls to the different phone number will be routed to the wireless device.

Multiple eSIM instances can exist in the eUICC at the same time. In some embodiments, a wireless device is shared by family members or by family and friends. Each person may have a unique eSIM instance associated with them. Each user of the device can select which eSIM to use when using the device.

The eSIM package installed in the manufacturing environment may be specific to an MNO or it may be a generic package with utility to a number of different MNOs. That is, the data blob in the eSIM package can be used by an eUICC to create the minimal eSIM. The minimal eSIM can include an OTA key which is common to more than one MNO. In some embodiments, an MNO uses an OTA key set which is kept secret from other MNOs. A key set comprises ciphering and integrity keys. After the eUICC instantiates the minimal eSIM, a given MNO can authenticate itself to the eSIM using the OTA key set. The MNO can then customize the eSIM using RFM or RAM protocols. In some embodiments, after the MNO authenticates the instantiated eSIM, the MNO rotates (i.e. replaces) the key set in the eSIM. For example, the MNO can use a PUT KEY provisioning command to replace the existing key set after authentication. The customization can be done using RFM or RAM protocols to, for example, modify file content or load new applets on the eSIM.

Some manufacturing environment problems are addressed as follows. The confidential information of the MNO is encrypted before being sent from the eSIM vendor to the chip vendor. The key used for encryption, the KEK, is sent to an OEM server at the wireless device factory. The chip vendor produces a wafer with a plurality of eUICC dies. Each die is programmed with encrypted data. Some of the data is unique to a particular die. For example, a chip serial number is uniquely assigned to each die, in some embodiments. After the dies are programmed, the wafer is cut up and the dies are mounted in wafer level chip scale packages (WLCSPs), in some embodiments. The finished chips are sent to the wireless device factory. At the wireless device factory, a given eUICC obtains the KEK which corresponds to it and decrypts the encrypted information within the eUICC itself.

In some embodiments, the confidential information of the MNO is encrypted twice before being sent from the eSIM vendor to the chip vendor. The first encryption is with a first encryption key and produces a first encryption result. The second encryption is with a KEK that accepts as its argument the first encryption result and the first encryption key. The key used for the second encryption, the KEK, is sent to an OEM server at the wireless device factory. The chip vendor cannot discover the contents of the MNO confidential information (eSIM data) because the chip vendor does not have access to any of the KEKs. The chip vendor produces a wafer with a plurality of eUICC dies as in the single encryption case and sends the resulting chips to the wireless device factory. The wireless device factory cannot obtain the confidential information of the MNO (eSIM data) because the wireless device factory does not have access to the internal data of any of the eUICCs. At the wireless device factory, a given eUICC obtains the KEK which corresponds to it and decrypts to recover the first encryption key and a remaining encrypted portion. The eUICC then uses the recovered first encryption key to decrypt the remaining encrypted portion.

In some embodiments, the eSIM generates a plurality of eSIM profiles. A particular eSIM profile is encrypted with a particular eSIM encryption key. In some embodiments, the eSIM encryption key is unique to the eUICC in which the eSIM profile is intended to be programmed. The eSIM encryption key with other sensitive data (e.g., other keys associated with the intended eUICC) is encrypted with the KEK. In some embodiments, multiple KEKs are used for a single intended eUICC. For example, in some embodiments, there is a second KEK dedicated for encryption of the eSIM encryption key. In some embodiments, the data sent to the chip vendor comprises the result of encrypting, with the KEK, the eSIM encryption key and sensitive data. The chip vendor in some embodiments is also sent the eSIMs encrypted with the eSIM encryption key. The KEK (or KEKs) of the intended eUICC and a chip serial number of the intended eUICC are sent to the OEM server at the wireless device factory. The OEM server can use the chip serial number to identify the eUICC when providing the KEK to the eUICC.

After the decryption is complete at the eUICC, the eUICC will be in possession of an unencrypted data blob and other information, in some embodiments. The (unencrypted) data blob can contain one or more eSIM profiles which represent functional eSIMs. For example, an eSIM package from the eSIM vendor can include one common data blob and a set of unique data blobs. Each unique data blob can contain a set of unique data based on the requirements of an MNO. For example, each unique data blob can include one or more of an ICCID, an IMSI, an OTA key set, a subscriber key or an integrity key. In such an embodiment, each element of the set of unique data blobs can correspond to one unique eSIM instance. The set of unique data blobs can include a first unique data blob and a second unique data blob. At a first time of instantiation, the eUICC can be commanded to use the common data blob and either the first unique data blob or the second unique data blob to instantiate a first eSIM. At another time, the eUICC 102 can be commanded to instantiate a second eSIM using the common data blob and a unique data blob, which has not yet been used for eSIM instantiation.

In some embodiments, the data blob contains files or auxiliary information which the eUICC can use to instantiate a minimal eSIM. The minimal eSIM can be unique and functional, allowing access to network services. Alternatively, the minimal eSIM can be made unique using a one-time-use element or a value corresponding to an ICCID recovered from the data blob. The one-time-use element is a binary string placed in the eSIM package by the eSIM vendor. The unique eSIM can then be made functional, in some embodiments, by communicating with an MNO. The MNO can authenticate the eUICC using an OTA key or OTA key set or using a public key associated with the eUICC for which the eUICC possesses the corresponding private key. The MNO can then provide information such as an IMSI and a subscriber key to make the eUICC functional. After the eUICC is functional, further components can be added to an instantiated eSIM such as applets and files. The applets and files may be specific to the user of the wireless device. Exemplary key sets, a key hierarchy, and USIM (pertinent to eSIM) security are described in 3GPP TS 33.401, v12.15.0, dated September 2015 and entitled "Security Architecture" (hereinafter "TS 33.401"). TS 33.401 is hereby incorporated by reference.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) radio access technologies (RATs). In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

eUICC Operation

Figure 2:
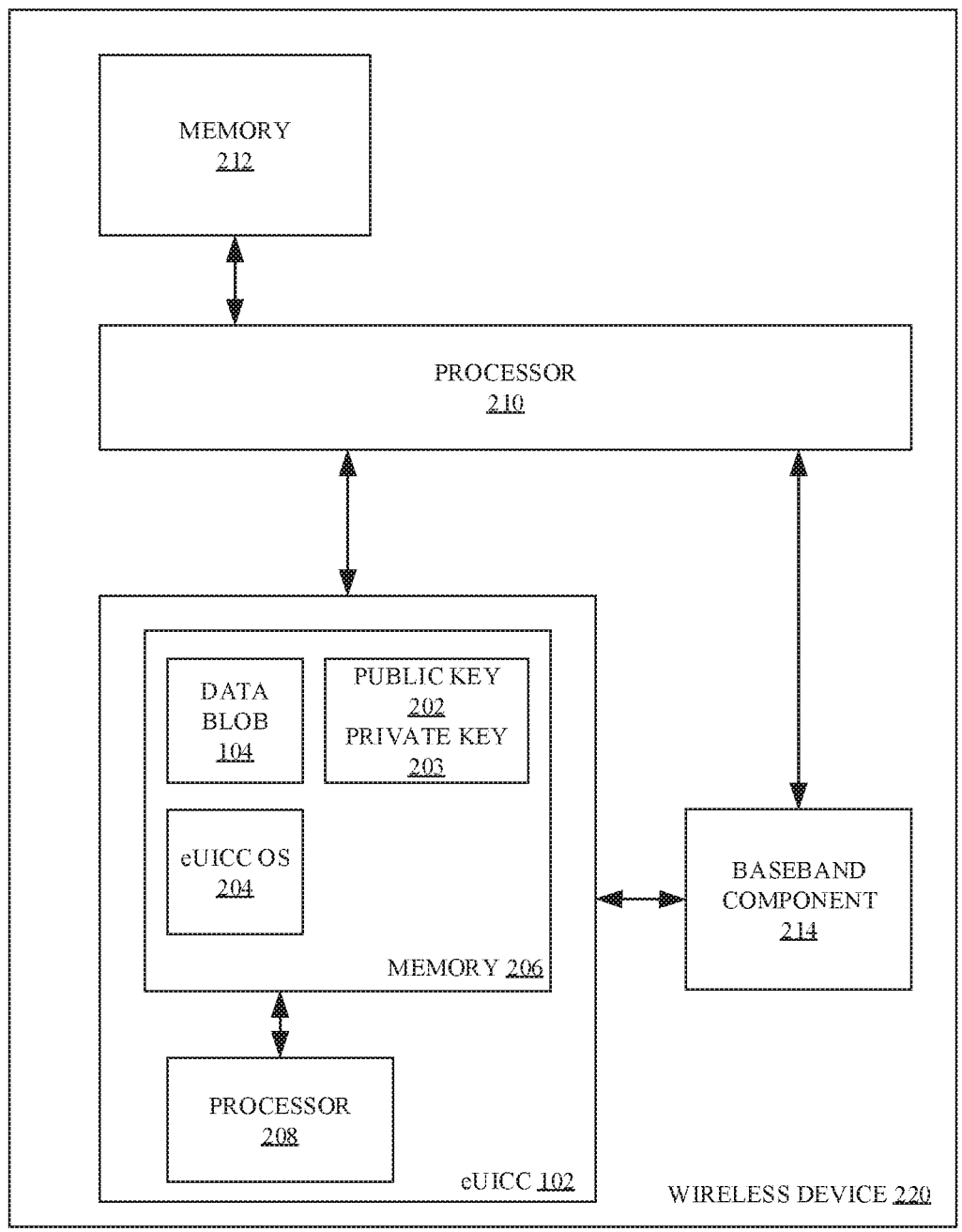
FIG. 2 illustrates an exemplary block diagram of a wireless device apparatus that includes the data blob and the eUICC in accordance with some embodiments.

FIG. 1 illustrates an example system 100 for installing an eSIM package 106 in an eUICC 102 in a manufacturing environment 108. In some embodiments, the manufacturing environment 108 corresponds to a chip factory. eSIM package 106 includes a data blob 104. In some embodiments, data blob 104 includes data for instantiating a generic eSIM, which is then rendered unique by the eUICC. In some embodiments, data blob 104 includes an integrated circuit card identifier (ICCID) which is stored in eUICC 102 and which is incremented each time the eUICC 102 instantiates a new eSIM based on data blob 104.

eUICCs are installed in wireless devices as part of a manufacturing process. FIG. 2 illustrates an example system with the eUICC 102 configured with the data blob 104 installed in a wireless device 220. Wireless device 220 includes a memory 212, a processor 210, a baseband component 214 and the eUICC 102. The eUICC 102 also includes a memory 206 and a processor 208. The memory 206, in the exemplary configuration of FIG. 2, comprises the data blob 104, a public key 202, a private key 203, and an eUICC operating system (OS) 204. In some embodiments, the eUICC 102 includes an OTA key (not shown).

Figure 3:
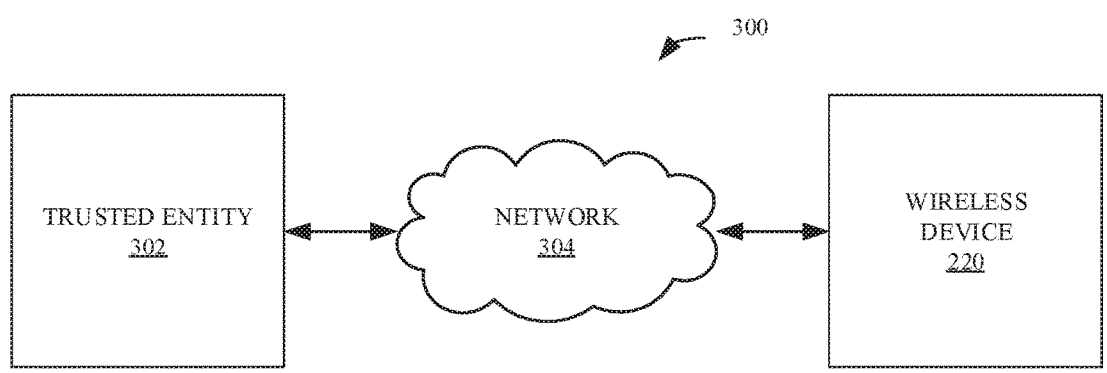
FIG. 3 illustrates an exemplary block diagram of a trusted entity in communication with the wireless device, in accordance with some embodiments.

FIG. 3 illustrates an exemplary embodiment in which a trusted entity 302 communicates with wireless device 220 through a network 304. Network 304 may be either a wired or wireless network (or a combination thereof). In some embodiments, the trusted entity 302 and the eUICC 102 authenticate each other. For example, the trusted entity 302 can issue a challenge message encrypted with the public key 202 of the eUICC 102. The eUICC 102 can then decrypt the challenge message using its private key 203. The eUICC 102 can similarly authenticate the identity of the trusted entity 302 by demanding a correct response to a message encrypted using a public key of the trusted entity 302 (not shown). In some embodiments, the challenge is based on the OTA key. After authentication is complete, the trusted entity 302, in some embodiments, commands wireless device 220 to instantiate an eSIM.

Figure 4:
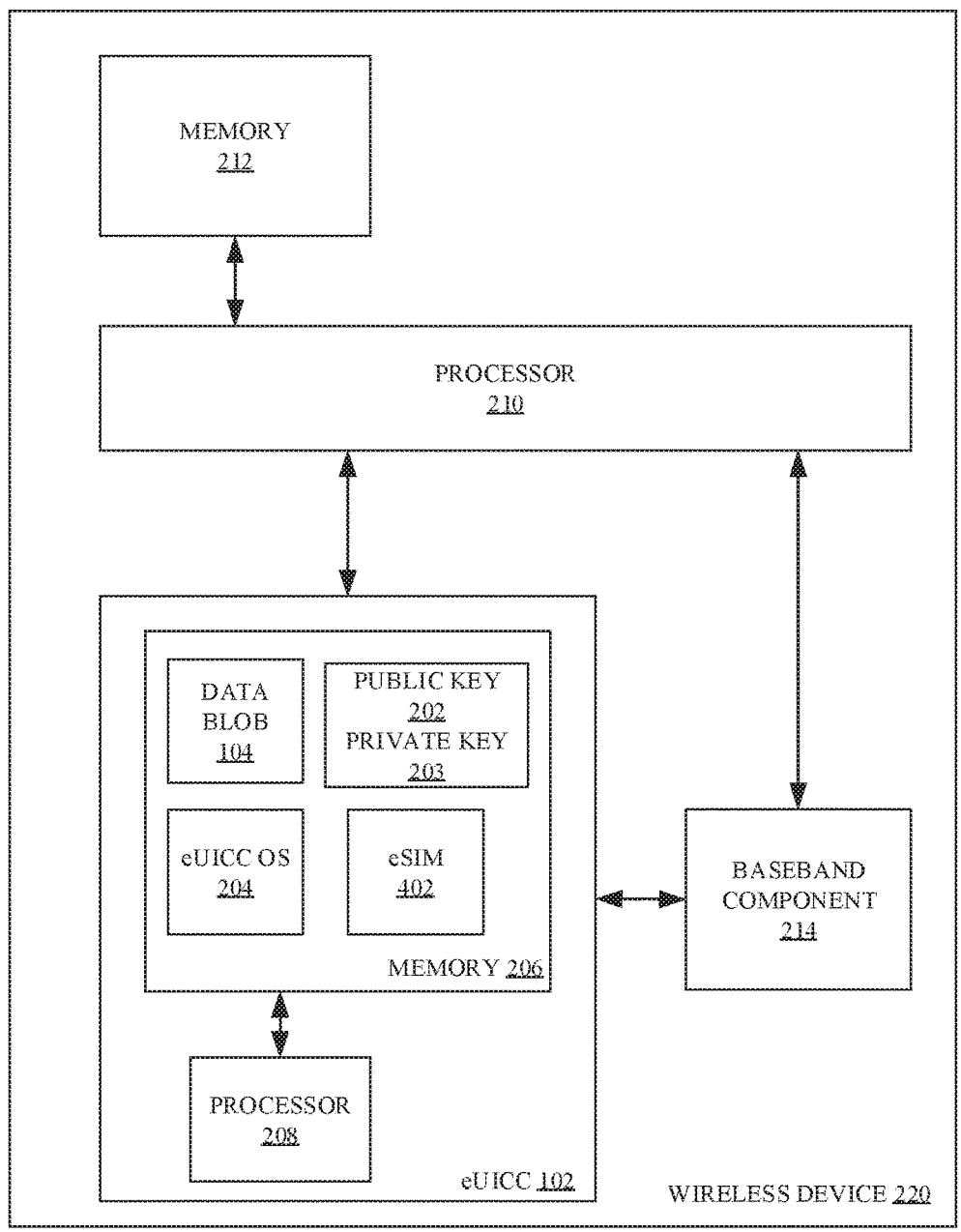
FIG. 4 illustrates an exemplary eSIM instantiated in the wireless device in accordance with some embodiments.

FIG. 4 illustrates an exemplary system 400 with an eSIM 402 in the eUICC 102. The eSIM 402 is instantiated by the eUICC 102 in response to a command from the trusted entity 302. Alternatively, a command can be received by the eUICC 102 from a user of the wireless device 220. The eUICC 102 responds to the command, from whatever source, by instantiating eSIM 402, based on generic data from data blob 104 in memory 206. It is a system constraint of eSIM design that no two eSIMs recognized by an MNO can be the same. In some embodiments, the first eSIM (that is, eSIM 402) instantiated in the eUICC 102 is unique based on data blob 104 being uniquely generated for use by the eUICC 102. In some embodiments, the eSIM 402 is functional and contains all data necessary to access network services from an MNO. In some embodiments, data blob 104 is generated for use by a number of different eUICCs, and uniqueness is imposed after instantiation. In some embodiments, the eUICC 102 renders the eSIM 402 unique using an ICCID present in the data blob 104. After rendering the eSIM 402 unique using the ICCID, the eUICC 102 increments the ICCID value to produce a new ICCID value and stores the new ICCID value in the memory 206. In some embodiments, applets are also instantiated based on data in the data blob 104.

In some embodiments, the data blob 104 includes a number of distinct elements to be used for only one eSIM instantiation. These one-time-use elements are binary strings which the eUICC 102 uses to render unique a newly instantiated eSIM. After a given one-time-use element has been used, the eUICC 102 keeps a record in memory 206 that the given one-time-use element is now stale. The data blob 104, in some embodiments, is on the order of 50-70 kbytes in size and a given one-time-use element is on the order of 2-5 bytes (where a byte is 8 bits).

In some embodiments, when the wireless device 220 of FIG. 4 camps on a cellular radio network operated by an MNO, the MNO provisions additional SIM profile data to the eSIM 402 using over the air (OTA) Hypertext Transport Protocol Secure (HTTPS) or Short Message Service (SMS) methods. In some embodiments, over the air provisioning is done using an OTA key associated with a specific MNO. In some embodiments, OTA provisioning is done using an OTA key common to a number of different MNOs.

In some embodiments, after instantiation of the eSIM 402, an MNO modifies files of the eSIM 402 or loads new applets using RFM or RAM protocols.

The eSIM 402 has a unique identity gained by one of the above methods. Associated with eSIM 402 are an IMSI, a subscriber key and a device phone number. The user can then access an MNO with wireless device 220 for services. When access is attempted, the eSIM 402 will participate in an authentication and key (AKA) agreement using the IMSI and the subscriber key. In some embodiments, the AKA is performed with a home location register (HLR), visitor location register (VLR) or mobility management entity (MME). In an exemplary scenario, an MNO network on which wireless device 220 is camped includes an MME. After the user's wireless device 220 successfully completes the AKA, incoming voice calls to the user's phone number will be routed by the MME to the wireless device 220.

The user may sell their wireless device 220 to a second party. Before the sale, in some embodiments, the user commands the wireless device 220 to erase or delete eSIM 402. The sale is then completed and the second party owns and possesses wireless device 220. However, wireless device 220 cannot take a first step to access MNO services because there is no eSIM to perform AKA. In some embodiments, there is no sale involved but rather a second eSIM needs to be instantiated and eSIM 402 is not deleted.

Figure 5:
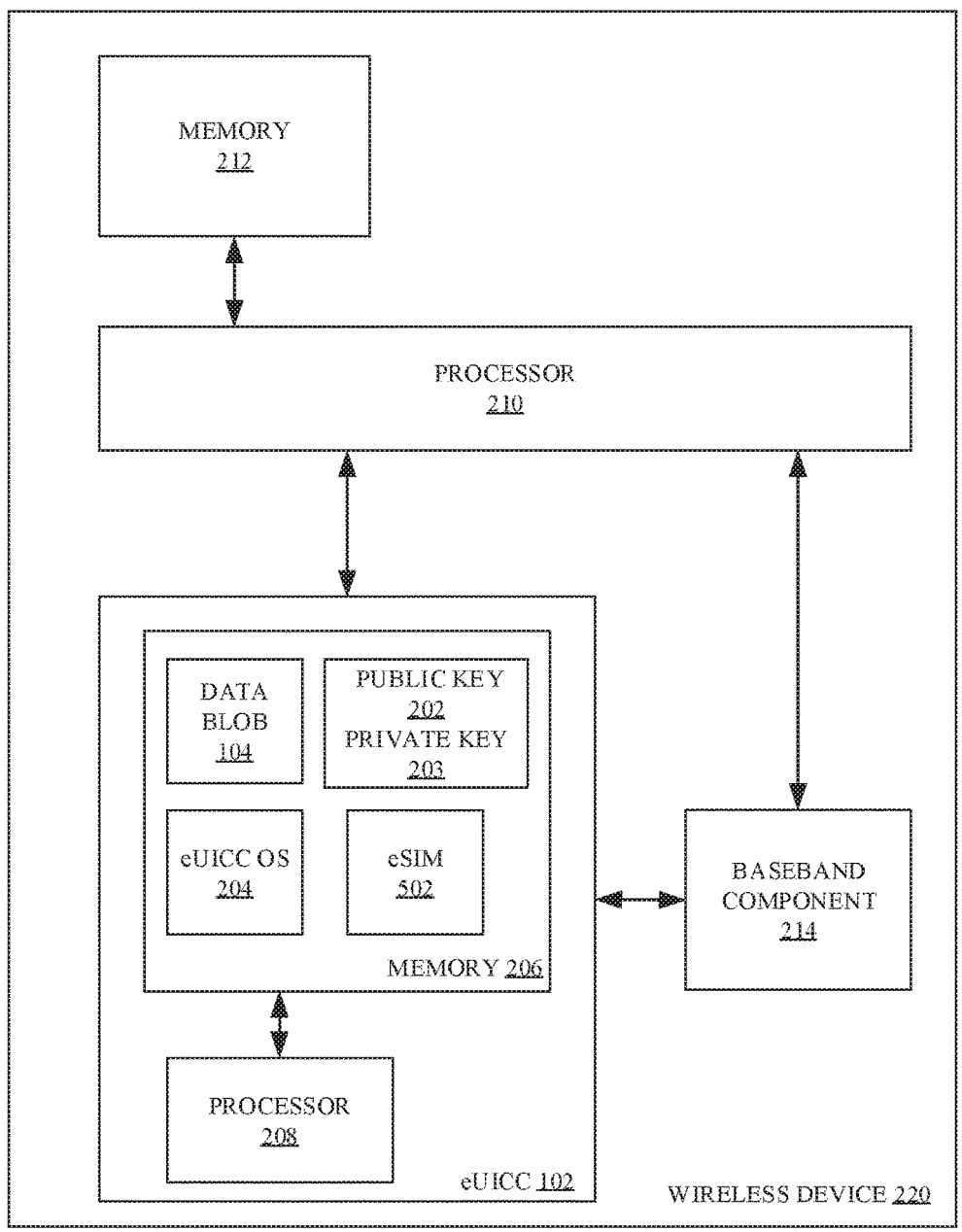
FIG. 5 illustrates a second exemplary eSIM instantiated in the wireless device in accordance with some embodiments.

A trusted entity (such as the trusted entity 302 or another trusted entity), in some embodiments, commands the eUICC 102 to instantiate a second eSIM, for example, an eSIM 502 illustrated in FIG. 5. In some embodiments, the eUICC 102 receives the command to instantiate from the second party. The eUICC 102 has retained the data blob 104 in memory 206. The eUICC 102 then instantiates eSIM 502 using the data blob 104. In some embodiments, the eSIM 502 is initially identical to eSIM 402 after eSIM 402 was first instantiated. In some embodiments, eSIM 502 is unique upon instantiation with the uniqueness based on the eUICC 102 using the stored incremented ICCID value, based upon the eUICC 102 using a fresh one-time-use element, or based on another unique input. In some embodiments, eSIM 502 is provisioned with data to render it unique after wireless device 220 camps on a cellular radio network of an MNO which provides customization data. This MNO-sourced data can be provisioned to the eSIM 502 using OTA HTTPS or SMS as mentioned above. In some embodiments, there is no sale involved and eSIM 402 remains resident, or present, (not shown in FIG. 5) in eUICC 102 after instantiation of eSIM 502.

The eSIM 502 has a unique identity gained by one of the above methods. Associated with eSIM 502 are a new IMSI, a new subscriber key and, in some embodiments, a different device phone number. The second party can then access an MNO with wireless device 220 for services. When access is attempted, the eSIM 502 will participate in an AKA using the new IMSI and the new subscriber key. After the second party's wireless device 220 successfully completes the AKA, incoming voice calls to the different phone number will be routed to the wireless device 220.

Figure 6A:
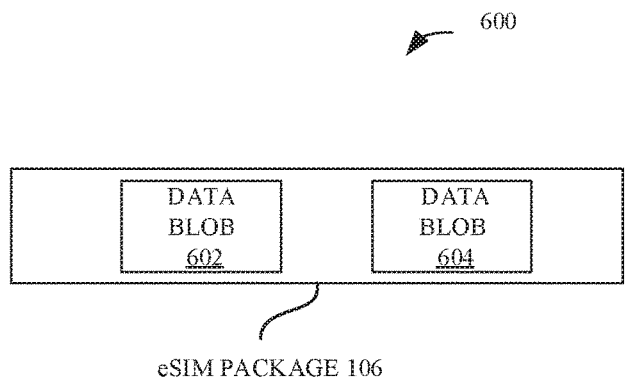
FIG. 6A illustrates an exemplary eSIM package including two data blobs in accordance with some embodiments.

In some embodiments, the eSIM package 106 includes a plurality of data blobs. FIG. 6A illustrates an exemplary embodiment in which the eSIM package 106 includes a data blob 602 and a data blob 604. At a time of eSIM instantiation, the trusted entity 302 can command the eUICC 102 to use a particular one of the plurality of data blobs. For example, for a first and a second eSIM instantiation, the eUICC 102 can be commanded to use the data blob 602 and increment the ICCID value found in data blob 602 (and therewith achieve uniqueness of the second eSIM from the first). For a third eSIM instantiation, the eUICC 102 can be commanded to use the data blob 604. The first and second eSIMs may be initiated in response to commands from a trusted entity associated with a first MNO, and the third eSIM may be instantiated in response to a command from a trusted entity associated with a second, different, MNO. In exemplary embodiments, data blob 602 is configured for the first MNO and data blob 604 is configured for the second MNO.

Figure 6B:
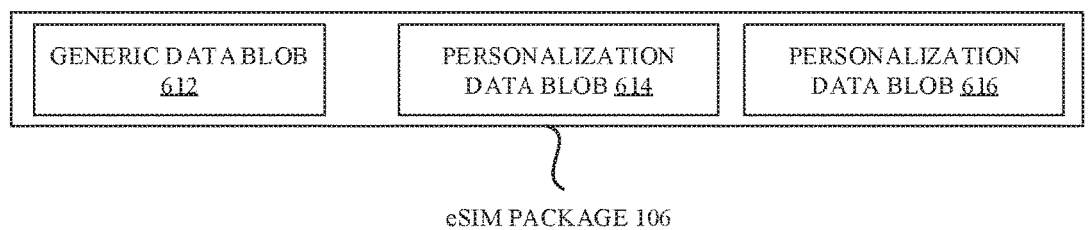
FIG. 6B illustrates an exemplary eSIM package including a generic data blob and two personalization data blobs in accordance with some embodiments.

In some embodiments, eSIM package 106 includes one common data blob and a set of unique data blobs. In such an embodiment, each element of the set of unique data blobs can correspond to one unique eSIM instance. The set of unique data blobs can include a first unique data blob and a second unique data blob. The unique data blobs provide unique personalization information to each unique eSIM instantiated. Thus, these data blobs are also referred to herein as personalization data blobs. In contrast, the common data blob, which is common to the multiple instantiations of unique eSIMs, is also referred to herein as a generic data blob. FIG. 6B illustrates an exemplary embodiment of eSIM package 106 comprising a generic data blob 612, a personalization data blob 614 and a personalization data blob 616. At a first time of instantiation, the eUICC 102 can be commanded by the trusted entity 302 or by the user of wireless device 220 to use the generic data blob 612 and either the personalization data blob 614 or the personalization data blob 616 to instantiate a first eSIM. At another time, the eUICC 102 can be commanded to instantiate a second eSIM using the generic data blob 612 and a personalization (unique) data blob which has not yet been used for eSIM instantiation.

Figure 7A:
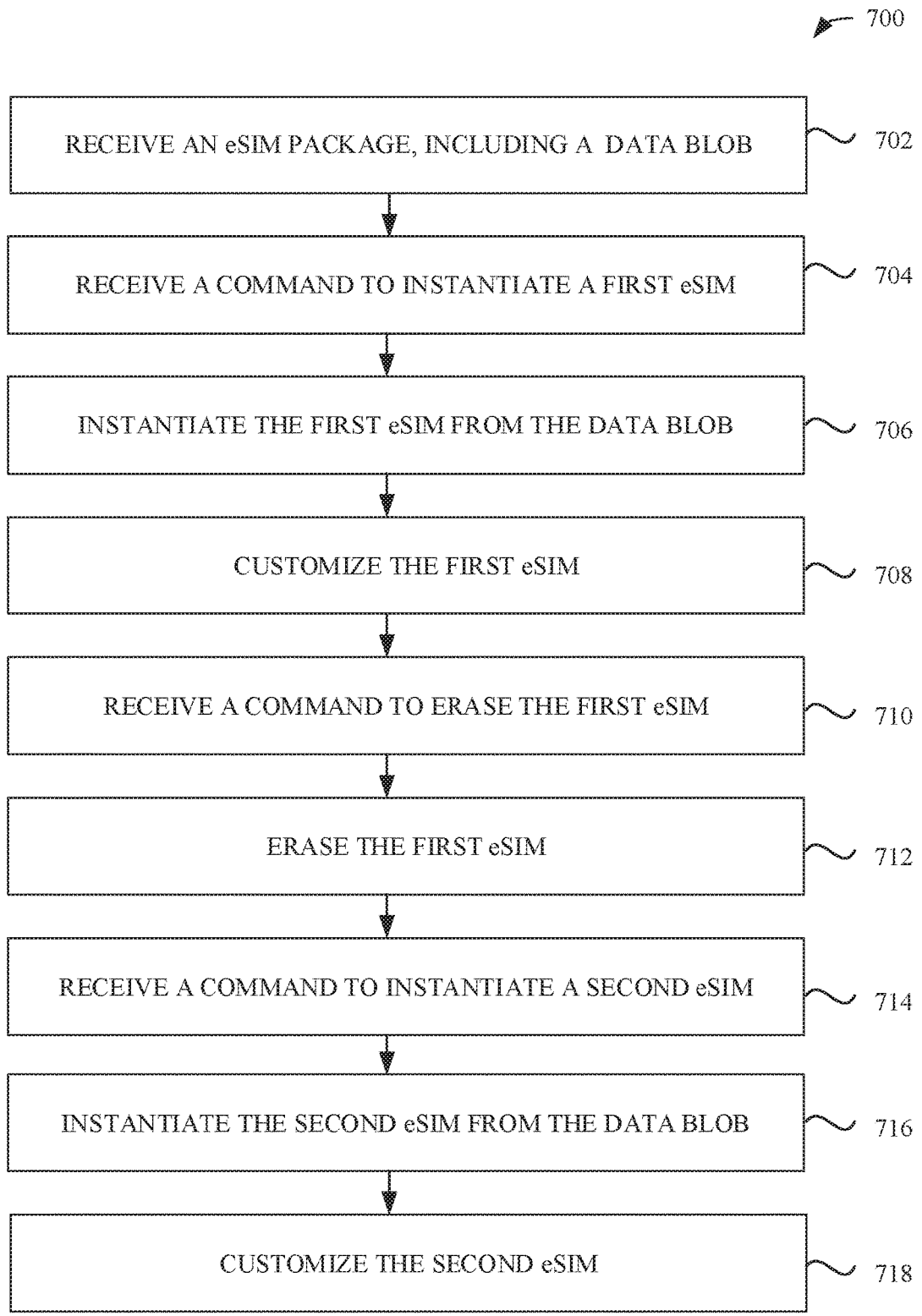
FIG. 7A illustrates exemplary logic for instantiation of multiple eSIM instances in a wireless device in accordance with some embodiments.

FIG. 7A illustrates exemplary logic 700 for instantiating first and second eSIMs from a data blob. At 702, an eUICC receives, in a manufacturing environment, an eSIM package including a data blob. At 704, the eUICC receives a command to instantiate a first eSIM. At 706, the eUICC instantiates the first eSIM. At 708, the eUICC customizes the first eSIM to make it unique. This can be done with a one-time-use element, with a count which is incremented, for example an incremented an ICCID value, or with some other unique input. In some embodiments, customization is done by a first mobile network operator using OTA HTTPS or SMS programming methods. At 710, the eSIM receives a command to erase the first eSIM and erases the first eSIM at 712. At 714, the eUICC receives a command to instantiate a second eSIM. At 716, the eUICC instantiates the second eSIM. The second eSIM can be instantiated from the data blob or from a second data blob in the eSIM package. At 718, the eUICC customizes the second eSIM. The customization of the second eSIM can be done in communication with an MNO.

Figure 7B:
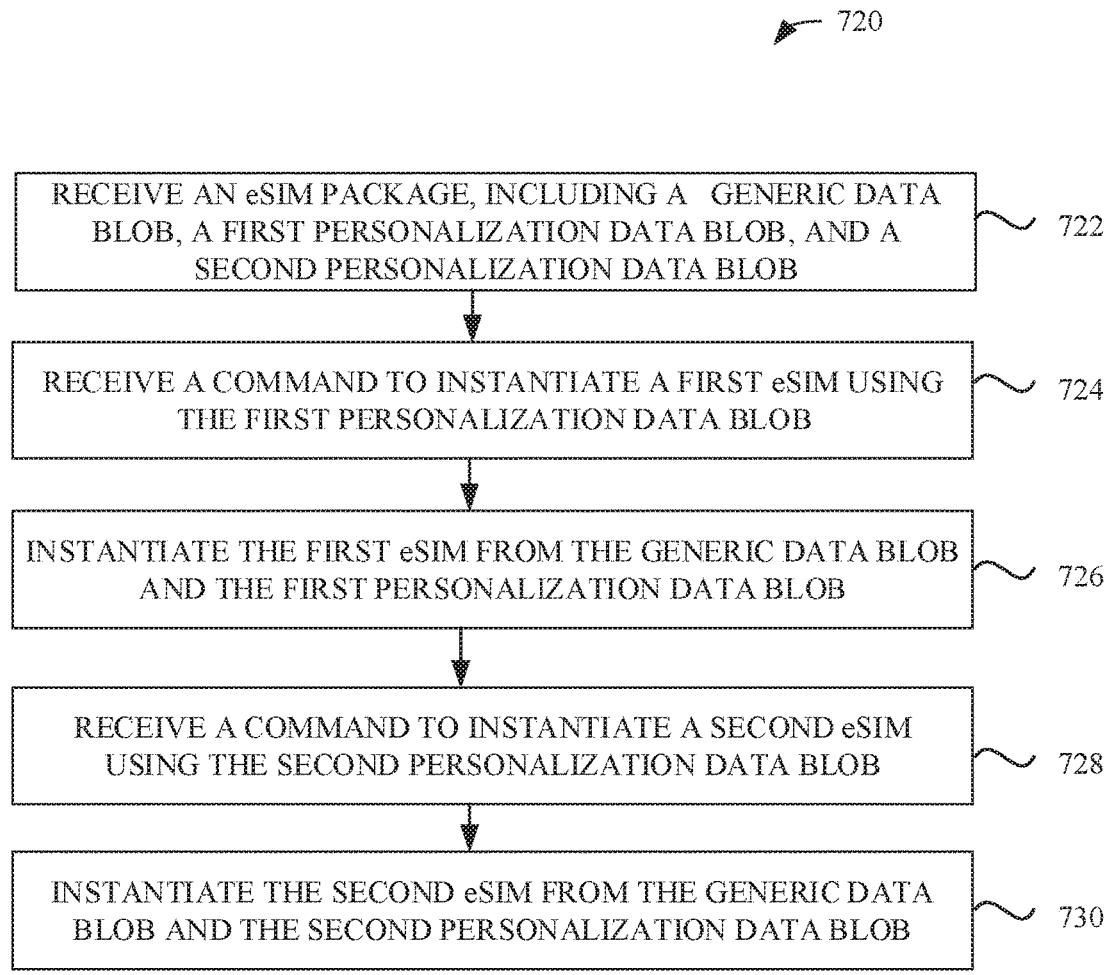
FIG. 7B illustrates exemplary logic for instantiation of multiple eSIM instances in a wireless device using multiple personalization data blobs in accordance with some embodiments.

FIG. 7B illustrates exemplary logic 720 for instantiating first and second eSIMs from an eSIM package including a generic data blob and two personalization data blobs. At 722, an eUICC receives, in a manufacturing environment, an eSIM package including a generic data blob, a first personalization data blob and a second personalization data blob. At 724, the eUICC receives a command to instantiate a first eSIM using the first personalization data blob. At 726, the eUICC instantiates the first eSIM using the generic data blob and the first personalization data blob. At 728, the eUICC receives a command to instantiate a second eSIM using the second personalization data blob. At 730, the eUICC instantiates the second eSIM using the generic data blob and the second personalization data blob.

eUICC Production Logic

Figure 8:
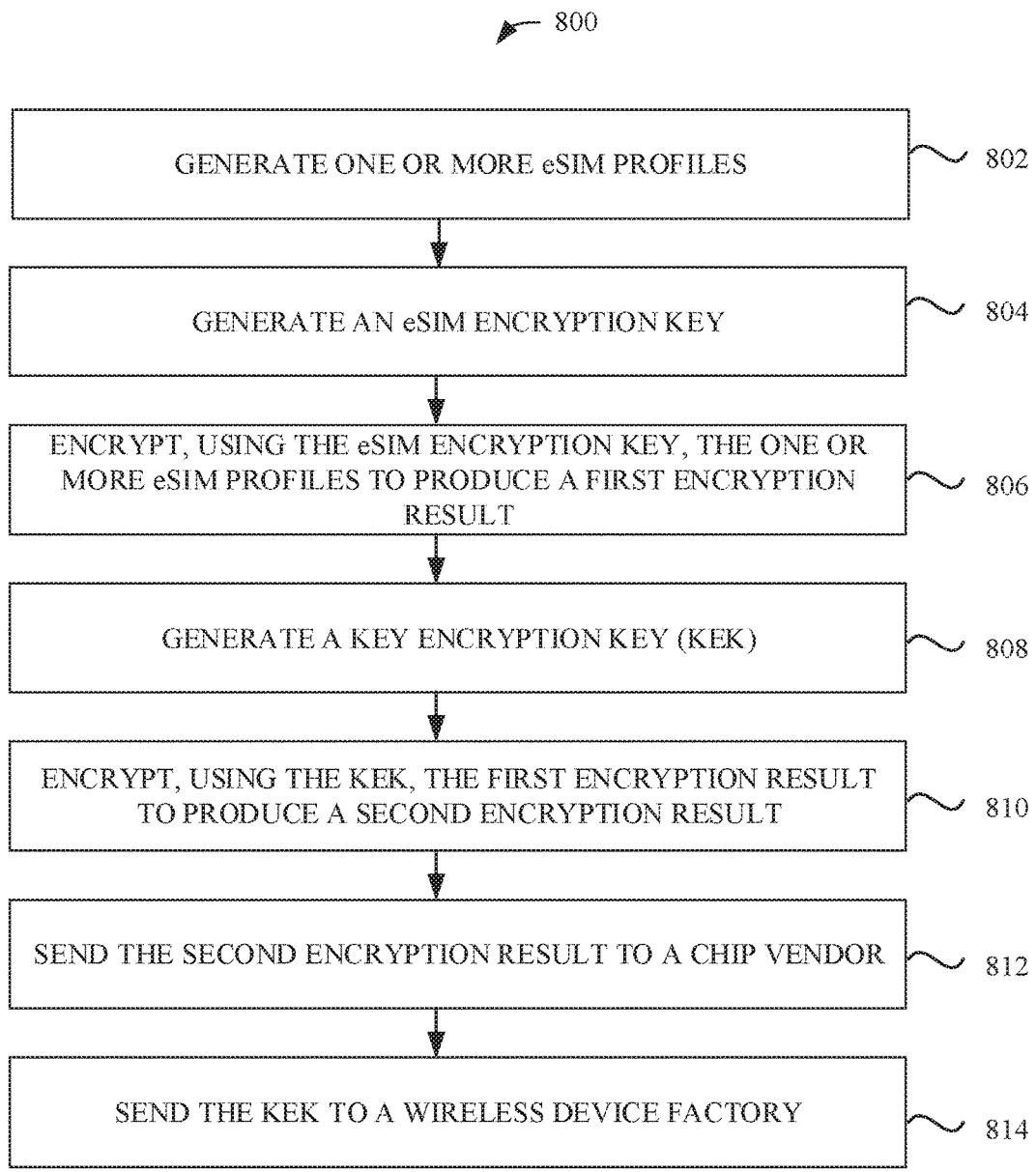
FIG. 8 illustrates exemplary logic implemented by an eSIM vendor in accordance with some embodiments.

FIG. 8 illustrates exemplary logic 800 for producing the eUICC 102. The participants include an eSIM vendor that provides encrypted information to a chip vendor. The eSIM vendor also provides related encryption information to a wireless device factory. The chip vendor uses the encrypted information to program a wafer. The wafer includes a number of chips or dies, which are packaged after being programmed. At 802, the eSIM vendor generates eSIM profiles. At 804, the eSIM vendor generates an eSIM encryption key. At 806, the eSIM vendor encrypts, using the encryption key, the eSIM profiles to produce a first encryption result. At 808, the eSIM vendor generates a key encryption key (KEK). At 810, the eSIM vendor encrypts, using the KEK, the first encryption result to produce a second encryption result. The eSIM vendor, at 812, sends the second encryption result to the chip vendor, and at 814, the eSIM vendor sends the KEK to the wireless device factory.

eSIM Vendor and Wireless Device Factory

Figure 9:
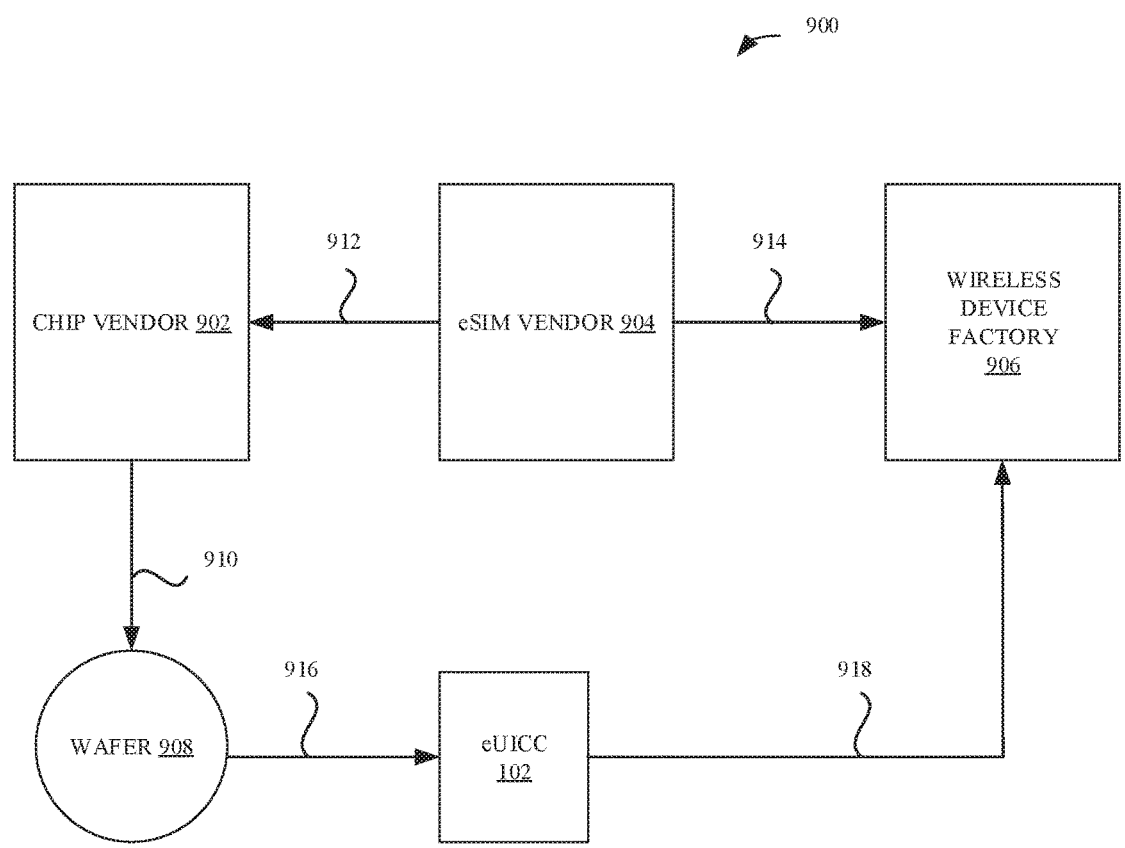
FIG. 9 represents an exemplary manufacturing environment in accordance with some embodiments.

FIG. 9 illustrates an exemplary system 900 for producing the eUICC 102 using the logic of FIG. 8. Overall, FIG. 9 illustrates an eSIM vendor 904 that provides encrypted information 912 to a chip vendor 902. The eSIM vendor 904 also provides related encryption information 914 to wireless device factory 906. The chip vendor 902 uses the encrypted information 912 to program wafer 908 as indicated by arrow 910. Wafer 908 comprises a number of chips or dies, which are packaged after being programmed. The encrypted information 912 is at the chip level. That is, eSIM vendor 904 generates per-chip data sets. The eUICC 102 (although not embedded at this point) is illustrated by arrow 916 as being based on wafer 908. The eUICC 102 is provided to the wireless device factory 906 as shown by the arrow 918.

A given MNO defines, in an exemplary embodiment, an eSIM profile. The eSIM vendor 904 creates a plurality of eSIMs based on the defined eSIM profile. The number of eSIMs produced is, for example, on the order of 1 million per defined profile. The eSIM vendor 904 then forms data blobs for incorporation into eUICCs to be produced by the chip vendor 902. The eUICC 102 is one of the eUICCs to be produced, for example. The eSIM vendor 904 also produces key data including, for example an eSIM encryption key and a KEK. The key data also includes an authentication key in some embodiments. In some embodiments, the key data includes public key 202 and private key 203. The related encryption information 914 includes a plurality of KEKs. In some embodiments, there is one KEK in the related encryption information 914 for each data blob encrypted in the encryption information 912.

The eSIM vendor 904 also produces an eUICC OS file according to the defined eSIM profile. In some embodiments, the eUICC OS file comprises eUICC OS 204. The eSIM vendor 904 also generates personalization data.

In an exemplary embodiment, the data to be encrypted includes one or more of: the eUICC OS file, the public key 202, the private key 203, an OTA key set, one or more defined eSIM profiles, a chip serial number, or the personalization data. A set of data to be encrypted is targeted to a single chip, in exemplary embodiments. For example, in some embodiments, the public key 202 and private key 203 are unique and a given public key 202-private key 203 pair will not be programmed into more than one chip.

The chip vendor 902 is not a trusted entity. The eSIM vendor 904 uses a portion of the key data to maintain the confidentiality of the MNO, thus only the encrypted information 912 is provided to the chip vendor 902. In some embodiments, the eSIM encryption key is used to encrypt the data to be encrypted to produce a first encryption result. The KEK is then used to encrypt the eSIM encryption key and the first encryption result to produce the encrypted information 912. The encrypted information 912 is sent to the chip vendor 902 as an encrypted data blob or encrypted eSIM package. The encrypted information 912 also includes, in some embodiments, a set of one-time-use elements as described above. In some embodiments, each data blob in the encrypted information 912 includes an ICCID.

Chip vendor 902 uses the encrypted information 912 to program the chips or dies of wafer 908. Thus, the defined eSIM profile is programmed without using over the air programming. Confidentiality is maintained using encryption. The chip vendor 902 is unable to read or parse encrypted information 912 because the chip vendor 902 does not have possession of the KEK.

A plurality of eUICC devices are produced in wafer level chip scale packages (WLCSPs) by the chip vendor 902. After manufacture of the wafer 908, including programming with the encrypted information 912 at the chip level, the plurality of WLCSPs is produced from the wafer 908. For example, the eUICC 102 can be one of the packaged devices resulting from the work of the chip vendor 902. The eUICC 102 then includes one version of the encrypted information 912, at the scale of one chip. For example, in some embodiments, the eUICC 102 has its own security features such as public key 202-private key 203 pair, its own OTA key, its own key set including multiple private/public keys, symmetric keys, and/or its own chip serial number. Some or all of these security features are encrypted with KEK to preserve confidentiality. At this point, there is no functional eSIM instantiated in the eUICC 102 because the encrypted information 912 has not been decrypted.

After fabrication of the eUICC 102 in the WLCSP form factor, it is sent among a plurality of eUICCs to the wireless device factory 906.

Figure 10:
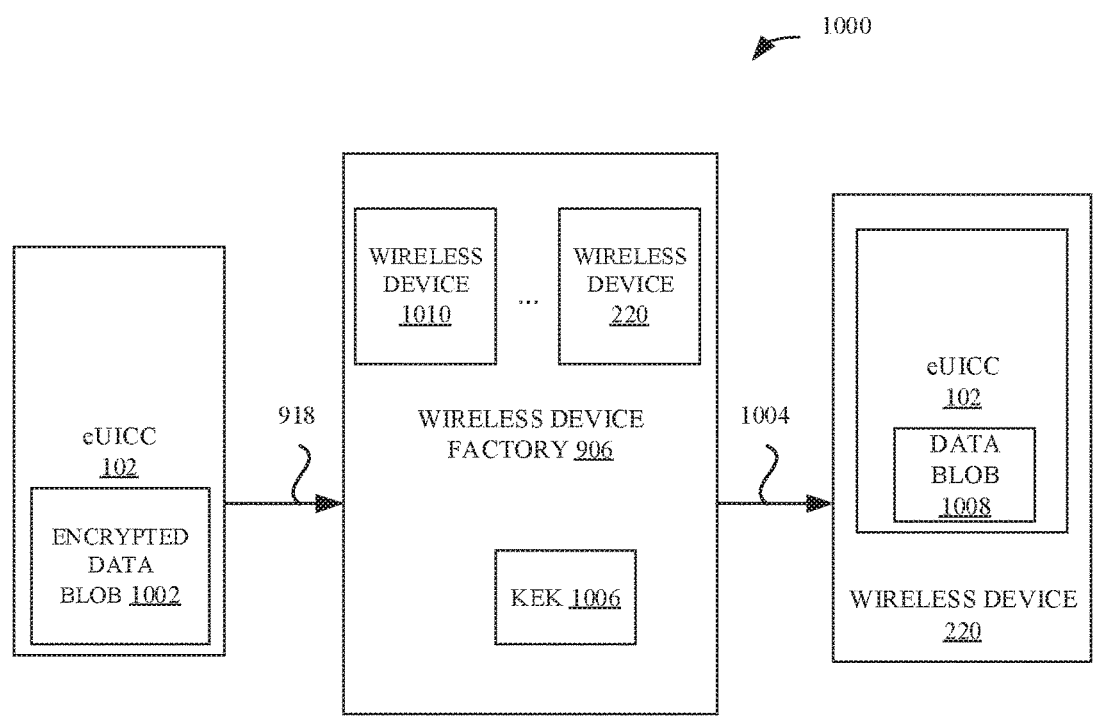
FIG. 10 illustrates exemplary operations at a wireless device factory in accordance with some embodiments.

FIG. 10 illustrates an exemplary process 1000 for application of a KEK 1006 corresponding to an encrypted data blob 1002 programmed into the eUICC 102. In some embodiments, encrypted data blob 1002 of FIG. 10 is an encrypted version of data blob 104 of FIG. 1. Wireless device factory 906 has received the KEK 1006 for the eUICC 102 in the related encryption information 914. Wireless device factory 906 includes wireless device 1010, other wireless devices signified by an ellipses (" . . . ") and wireless device 220. Wireless device 220, as represented inside of wireless device factory 906, awaits installation of eUICC 102. In some embodiments, the eSIM vendor 904 sends the related information 914 to a central OEM data center and the related information 914 is later provided to an OEM server (not shown) at the wireless device factory 906. At the wireless device factory 906, the eUICC 102 provided by the chip vendor 902 is installed in the wireless device 220 (shown as emerging from the wireless device factory 906 by the arrow 1004).

In some embodiments, the eUICC 102 performs a mutual authentication protocol with the OEM server to establish that the OEM server is authentic and to prove its own identity. The public key 202—private key 203 pair can be used for this purpose. That is, the OEM server can encode a challenge with the public key 202 and send it to the eUICC 102. The eUICC can prove possession of the private key 203 (and thus, its authenticity, its identity) by successfully decoding the challenge and responding with the decoded challenge to the OEM server. In some embodiments, the chip serial number of the eUICC 102 is used by the OEM server to address the eUICC 102.

In some embodiments, the eUICC 102 and the OEM server can establish a session key using one of a number of algorithms, for example a Diffie-Hellman algorithm. In some embodiments, the OEM server encrypts the KEK 1006 with the established session key and sends it to the eUICC 102. The eUICC 102 can then recover KEK 1006 using the established session key and decrypt the encrypted data blob 1002 to produce a first decryption result including an encryption key and remaining encrypted information. The eUICC 102 can use the eSIM encryption key to decrypt the remaining encrypted information to produce a second decrypted result. The second decryption result can include the eUICC OS file, the public key 202, the private key 203, the OTA key, the one or more defined eSIM profiles, and the personalization data originally encrypted by the eSIM vendor 904 as described above.

In some embodiments, the underlying data has passed through a single encryption process at the eSIM vendor 904. After decryption with KEK 1006, for example, the underlying data is in the clear and no further decryption is required. That is, given definitions of the file sizes, data field delimiters or file markers, the eUICC can directly read the data encrypted by the eSIM vendor 904. For example, examples of data in the clear after decryption using the KEK 1006 are the eUICC OS file, the public key 202, the private key 203, the OTA key, the one or more defined eSIM profiles, or the personalization data.

In some embodiments, the one or more defined eSIM profiles of the second decryption result are not instantiated, that is, the one or more defined eSIM profiles do not represent one or more functional eSIMs. Rather, the one or more defined eSIM profiles of the second decryption result are data, represented as data blob 1008 in FIG. 10 and as data blob 104 in FIG. 1, from which one or more eSIMs can be instantiated.

In some embodiments, the one or more defined eSIM profiles of the second decryption result are instantiated by the decryption process of the eUICC 102. That is, the one or more defined eSIM profiles represent one or more functional eSIMs.

Representative Exemplary Apparatus

Figure 11:
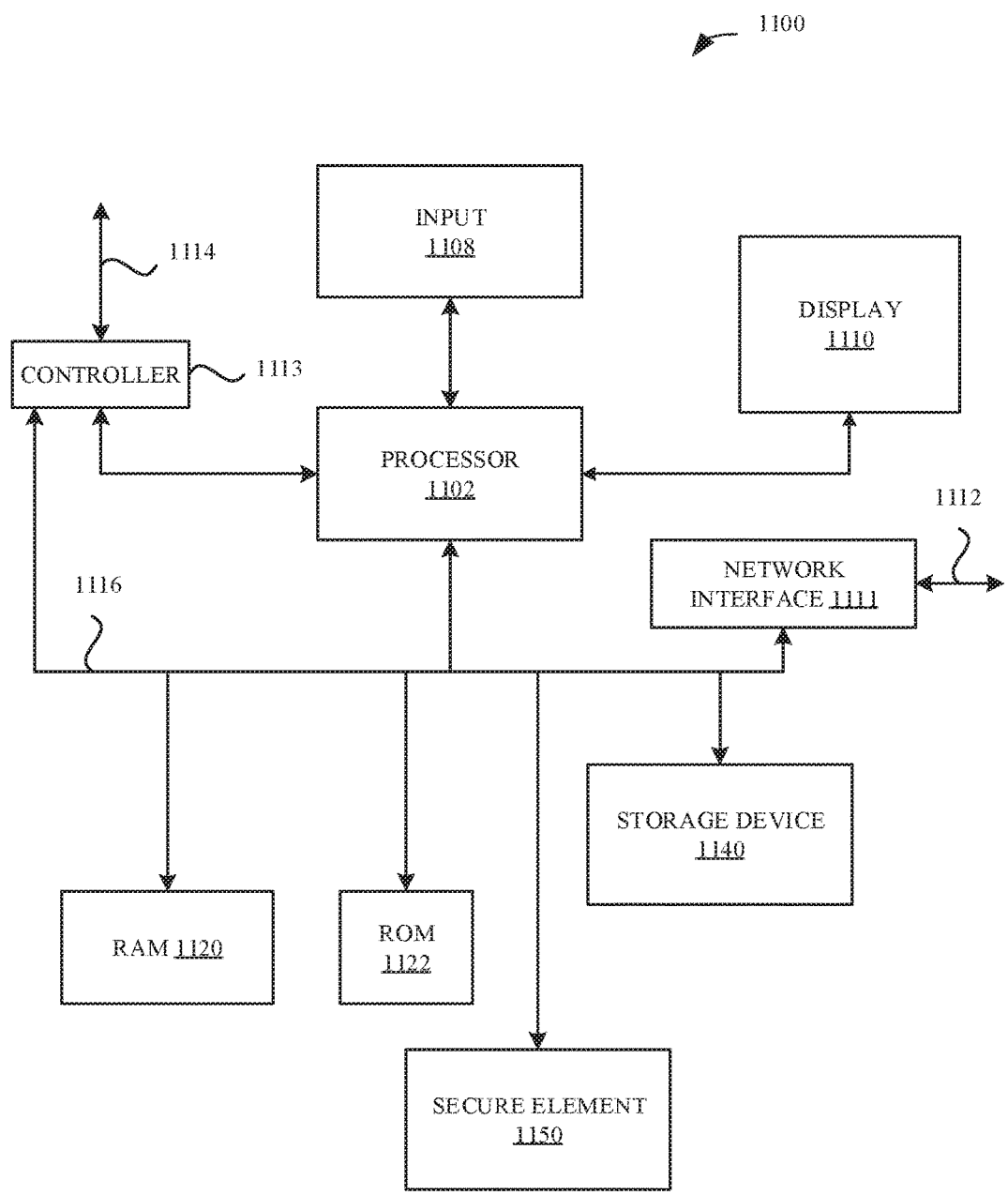
FIG. 11 illustrates an exemplary computing device in accordance with some embodiments.

FIG. 11 illustrates in block diagram format an exemplary computing device 1100 that can be used to implement the various components and techniques described herein, according to some embodiments. In particular, the detailed view of the exemplary computing device 1100 illustrates various components that can be included in the eUICC 102 of FIGS. 1, 4, 5, 9, and 10 and/or the wireless device 220 illustrated in FIGS. 2-5, and 10. As shown in FIG. 11, the computing device 1100 can include a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 (screen display) that can be controlled by the processor 1102 to display information to the user (for example, information relating to incoming, outgoing, or active communication session). A data bus 1116 can facilitate data transfer between at least a storage device 1140, the processor 1102, and a controller 1113. The controller 1113 can be used to interface with and control different equipment through an equipment control bus 1114. The computing device 1100 can also include a network/bus interface 1111 that couples to a data link 1112. In the case of a wireless connection, the network/bus interface 1111 can include wireless circuitry, such as a wireless transceiver and/or baseband processor. The computing device 1100 can also include a secure element 1150. The secure element 1150 can include an eUICC or a UICC.

The computing device 1100 also includes a storage device 1140, which can comprise a single storage or a plurality of storages (e.g., hard drives), and includes a storage management module that manages one or more partitions within the storage device 1140. In some embodiments, storage device 1140 can include flash memory, semiconductor (solid state) memory or the like. The computing device 1100 can also include a Random Access Memory ("RAM") 1120 and a Read-Only Memory ("ROM") 1122. The ROM 1122 can store programs, utilities or processes to be executed in a non-volatile manner. The RAM 1120 can provide volatile data storage, and stores instructions related to the operation of the computing device 1100.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method by an embedded universal integrated circuit card (eUICC) embedded in a wireless device, the method comprising:
at the eUICC:
receiving a request to instantiate a first electronic subscriber identity module (eSIM);
instantiating the first eSIM using generic data from a data binary large object (data blob); and
customizing the first eSIM using personalization data from a second data blob,
wherein:
the request is received (i) via a user interface of the wireless device or (ii) from a trusted network entity; and
the data blob and the second data blob are derived from an encrypted eSIM package installed in the eUICC by a manufacturer of the eUICC.

2. The method of claim 1, further comprising:
successfully completing an authentication and key agreement procedure with a mobile network operator subsequent to the customizing.

3. The method of claim 1, wherein the customizing the first eSIM is further based on first data from the data blob or based on second data from the eUICC.

4. The method of claim 3, wherein the first data is a first element from a set of one-time-use elements from the data blob.

5. The method of claim 3, wherein the second data is a value corresponding to an integrated circuit card identifier (ICCID).

6. The method of claim 1, further comprising:
receiving, via the wireless device, personalization data including a first international mobile subscriber identity (IMSI) and a first subscriber key from a first mobile network operator (MNO); and
storing the personalization data in the first eSIM.

7. The method of claim 6, further comprising:
generating a first challenge value based on the first IMSI and the first subscriber key; and
sending, via the wireless device, the first challenge value to the first MNO.

8. The method of claim 7, further comprising:
receiving, via the wireless device, an instruction to erase the first eSIM; and
erasing the first eSIM.

9. The method of claim 7, further comprising:
receiving a request to instantiate a second eSIM;
instantiating the second eSIM using the generic data from the data blob; and
customizing the second eSIM based on an element from a set of one-time-use elements or based on an incremented value of an integrated circuit card identifier (ICCID).

10. The method of claim 9, further comprising:
receiving, via the wireless device, second personalization data comprising a second IMSI and a second subscriber key from a second MNO; and
storing the second personalization data in the second eSIM.

11. The method of claim 10, further comprising:
generating a second challenge value based on the second IMSI and the second subscriber key; and
sending, via the wireless device, the second challenge value to the second MNO.

12. An embedded universal integrated circuit card (eUICC) comprising:
a memory;
processing circuitry coupled to the memory; and
an interface coupled to a processor of a wireless device, wherein the eUICC is housed in the wireless device,
wherein the memory is configured to store instructions that, when executed by the processing circuitry, cause the eUICC to:
receive a first request to instantiate a first electronic subscriber identity module (eSIM),
instantiate the first eSIM using generic data from a data binary large object (data blob), and
customize the first eSIM based on first data from the data blob, based on second data from the eUICC, or based on third data from a second data blob,
wherein:
the first request is received (i) via a user interface of the wireless device or (ii) from a trusted network entity; and
the data blob and the second data blob are derived from an encrypted eSIM package installed in the eUICC by a manufacturer of the eUICC.

13. The eUICC of claim 12, wherein the memory is further configured to store instructions that, when executed by the processing circuitry, further cause the eUICC to:
receive a second request to instantiate a second eSIM;
instantiate the second eSIM using the generic data from the data blob;
customize the second eSIM based on fourth data from the second data blob; and
when the first eSIM is customized based on first data from the data blob or second data from the eUICC:
receive, from the processor via the interface, personalization data including a first international mobile subscriber identity (IMSI) and a first subscriber key from a first mobile network operator (MNO), and
store the personalization data in the first eSIM.

14. The eUICC of claim 12, wherein the memory is further configured to store instructions that, when executed by the processing circuitry, cause the eUICC to:
authenticate the first request using an over the air (OTA) key set.

15. A method of preserving confidential information using a data binary large object (data blob) and a key encryption key (KEK), the method comprising:
by an electronic subscriber identity module (eSIM) vendor:
generating one or more eSIM profiles;
generating an eSIM encryption key;
generating the KEK;

encrypting, with the eSIM encryption key, a set of data to produce a first encryption result, wherein the set of data comprises one or more eSIM profiles;

encrypting, with the KEK, the first encryption result and the eSIM encryption key to produce a second encryption result, wherein the data blob comprises the second encryption result;

sending the data blob to a chip vendor; and sending the KEK to a wireless device factory.

16. The method of claim 15, wherein the set of data further comprises an embedded universal integrated circuit card (eUICC) operating system (OS) file.

17. The method of claim 15, wherein the set of data further comprises an embedded universal integrated circuit card (eUICC) public key —private key pair.

18. The method of claim 15, wherein the set of data further comprises an embedded universal integrated circuit card (eUICC) serial number.

19. The method of claim 15, wherein the set of data further comprises an over the air (OTA) key associated with a mobile network operator (MNO).

20. The method of claim 15, wherein the sending the KEK comprises sending a plurality of KEKs to the wireless device factory.

* * * * *